Aug. 19, 1969  W. R. McKAY  3,461,972
CARRIER FOR DISC HARROW
Filed May 18, 1966  4 Sheets-Sheet 1
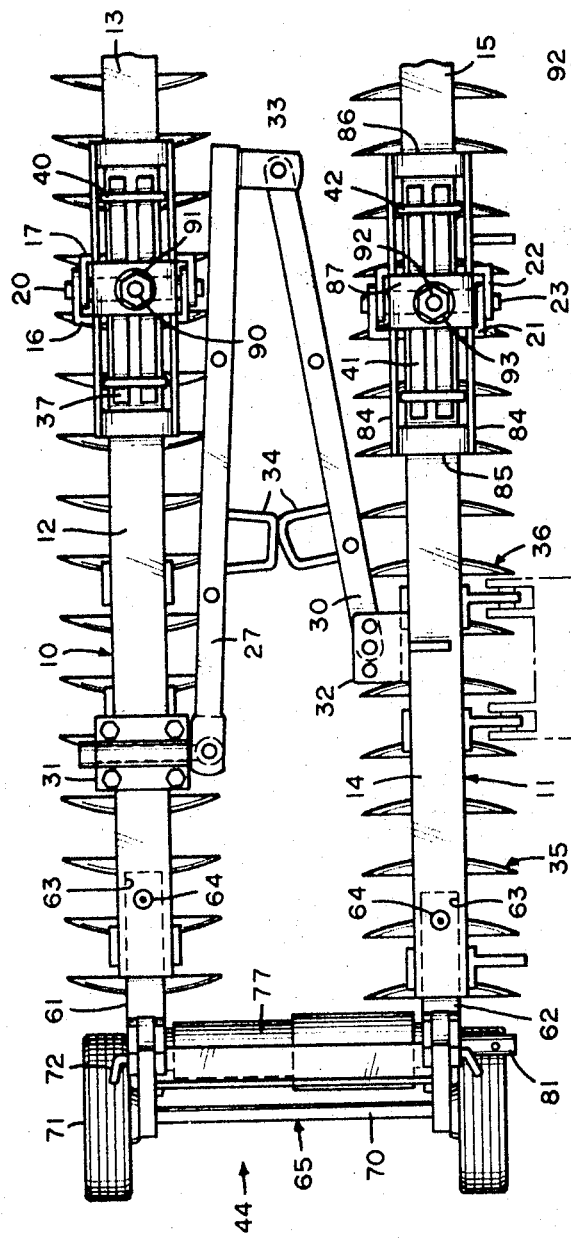
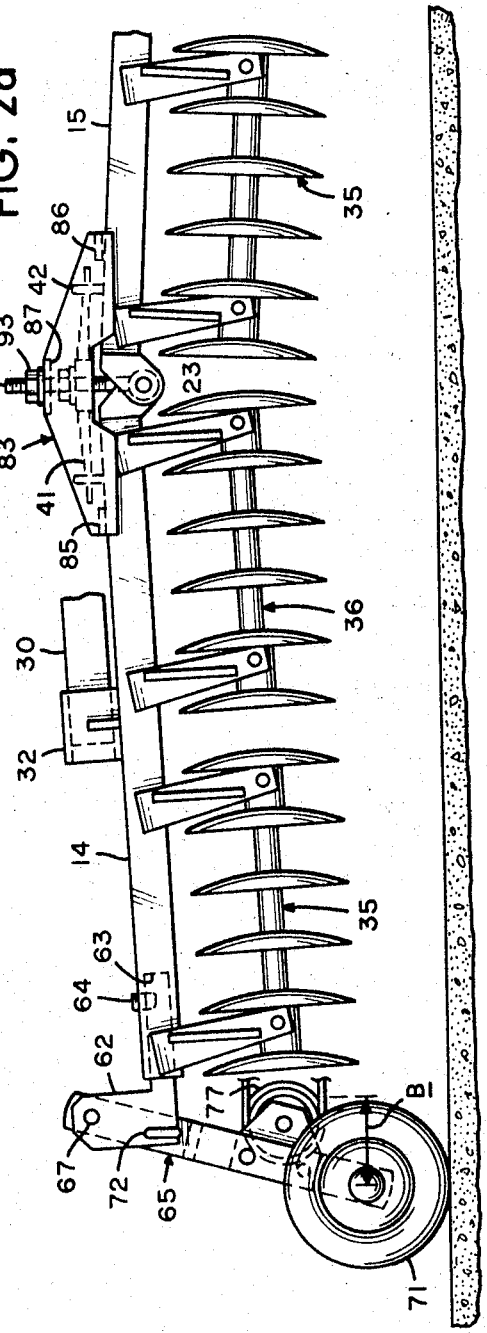
INVENTOR
WILLIAM R. McKAY
BY
Cohn and Powell
ATTORNEYS

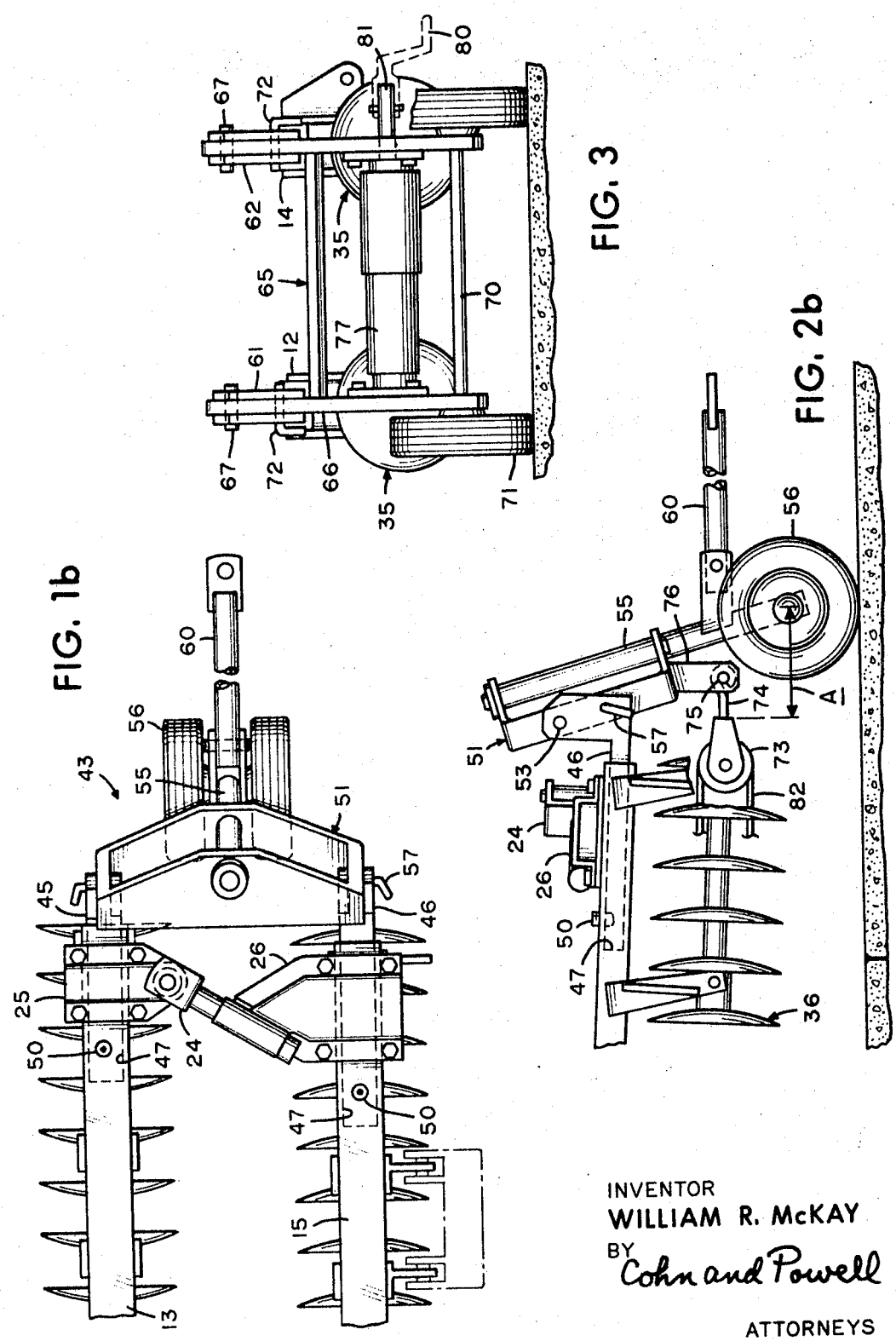

INVENTOR
WILLIAM R. McKAY
BY
Cohn and Powell
ATTORNEYS

Aug. 19, 1969   W. R. McKAY   3,461,972
CARRIER FOR DISC HARROW
Filed May 18, 1966   4 Sheets-Sheet 4

INVENTOR
WILLIAM R. McKAY
BY
Cohn and Powell
ATTORNEYS

United States Patent Office 3,461,972
Patented Aug. 19, 1969

3,461,972
CARRIER FOR DISC HARROW
William R. McKay, Lynwood, Calif., assignor to Alexander Manufacturing Company, a corporation of Mississippi
Filed May 18, 1966, Ser. No. 551,051
Int. Cl. A01b *63/16, 73/00*
U.S. Cl. 172—240
15 Claims

ABSTRACT OF THE DISCLOSURE

The carrier is for use in conjunction with a foldable harrow and includes interconnected harrow frames movable to a parallel folded position. Detachable transport units are connected to opposite ends of the folded harrow frames and elevating means are provided for selectively raising the harrow for transportation. Each harrow frame is in two sections and associated sections are held in arched longitudinal relation by bridge member interconnecting the sections.

---

This invention relates generally to improvements in a carrier for a harrow, and more particularly to an improved mechanism for conditioning the harrow for transport and for transporting the harrow.

An important objective is achieved by the provision of improved means connecting a harrow to transport units, by the provision of improved means for raising or lowering the harrow for transportation or usage respectively, and by the provision of improved means for angularly disposing the harrow frames to condition the harrow for transport.

Another important objective is realized by detachably connecting first and second transport units to opposite ends of a harrow, and by the provision of elevating means carried by the transport units for selectively raising the harrow for transportation.

Yet another important objective is afforded in that the elevating means operatively interconnects both transport units to lower one end of the harrow through one transport unit and subsequently lower the other end of the harrow through the other transport unit. It is advantageous that the elevating means operatively interconnects both transport units to raise the said other end of the harrow through the said other transport unit and subsequently raise the said one end of the harrow through the said one transport unit.

An important objective is attained by the provision of transport units, each of which includes a pivotally mounted frame and a ground-engaging member carried by the pivotally mounted frame, and by the structural arrangement in which the ground-engaging member is positioned relative to a vertical transverse plane passed through the pivot axis of the associated transport unit frame so that the weight of the harrow tends to swing the transport unit frame about the pivot axis to lower the harrow. A retaining means selectively and operatively associated with the transport unit frame maintains the ground-engaging member in a relatively fixed position relative to the harrow and locks the harrow in the raised position.

Another important objective is provided by the disposition of the ground-engaging member of one transport unit so that it is offset relative to the vertical transverse plane passed through the pivot axis of the associated transport unit frame a greater distance than the ground-engaging member of the other transport unit, whereby the frame of the said one transport unit swings about its pivot axis to lower its harrow end before the frame of the said other transport unit swings about its pivot axis to lower its harrow end, and whereby the frame of the said one transport unit swings about its pivot axis to raise its harrow end after the frame of the said other transport unit swings about its pivot axis to raise its harrow end.

Still another important objective is achieved by the provision of a tension member in the elevating means extending between and interconnecting the pivoted frames of the transport units, the tension member expanding or contracting selectively to lower or raise the frames of the transport units. More specifically, the elevating means includes a pulley carried by the frame of one transport unit, a winch carried by the frame of the other transport unit, and the tension member comprises a cable operatively interconnecting the winch and pulley, whereby selective turning of the winch will pivot the frames of the transport units and hence raise or lower the harrow.

An important objective is realized by constructing each transport unit to include a pair of arms and a frame pivotally mounted to the arms, and by the structural arrangement in which means detachably mounts the pair of arms of each transport unit to the harrow frames whereby to hold the harrow frames in folded position for transportation.

Another important objective is afforded by the provision of a hinge connection between each associated pair of frame sections, by the provision of resilient means interconnecting each associated pair of frame sections at the hinge connection for a controlled flexing action, and by the provision of a bridge selectively interconnecting each pair of associated frame sections at the hinge connection to hold the frame sections rigid for elevation and transport.

A further objective is attained in that the bridges hold the associated frame sections in an arch between the harrow ends when the harrow is raised for transport.

An important objective is to provide a harrow carrier that is simple and durable in construction, economical to manufacture and assemble, highly efficient in operation, and which can be utilized by anyone with little or no instruction.

The foregoing and numerous other objects and advantages of the invention will more clearly appear from the following detailed description of a preferred embodiment, particularly when considered in connection with the accompanying drawings, in which:

FIGS. 1*a* and 1*b*, combined, are a top plan view of the carrier and harrow;

FIGS. 2*a* and 2*b*, combined, are a front elevational view of the carrier and harrow shown in FIGS. 1*a* and 1*b*;

FIG. 3 is an end elevational view as seen from the left of FIG. 2*a*;

Figure 4:
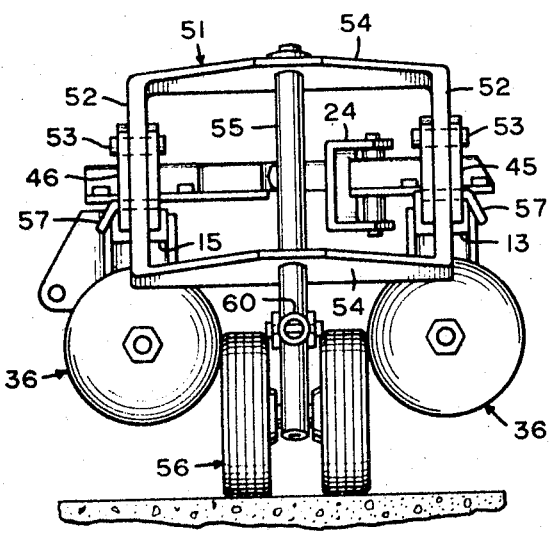
FIG. 4 is an end elevational view as seen from the right of FIG. 2*b*.

Referring now by characters of reference to the drawings, and first to FIGS. 1*a* and 1*b* and to FIGS. 2*a* and 2*b*, it will be understood that the disc harrow includes a pair of interconnected elongate frames generally indicated by 10 and 11. The harrow frame 10 consists of a pair of hingedly connected and aligned frame sections 12 and 13. Similarly, the harrow frame 11 consists of a pair of hingedly connected and aligned frame sections 14 and 15.

The hinge connection between the frame sections 12 and 13 includes a pair of overlapping substantially U-shaped brackets 16 and 17 attached to the adjacent ends of the frame sections 12 and 13. A horizontally disposed hinge pin 20 extends between and operatively interconnects the overlapping U-shaped brackets 16 and 17. This hinge connection enables the frame sections 12 and 13 to move independently in planes perpendicular to the axis defined by the hinge pin 20.

A similar hinge connection is provided between the frame sections 14 and 15. Briefly, a pair of overlapping, substantially U-shaped brackets 21 and 22, attached to adjacent ends of the frame sections 14 and 15, are operatively interconnected by a transverse, horizontally disposed hinge pin 23. This hinge connection enables the frame sections 14 and 15 to move independently in planes perpendicular to the axis provided by the hinge pin 23.

The harrow frames 10 and 11 are operatively interconnected at one end to enable the harrow frames 10 and 11 to be moved to an angularly related, expanded position for usage, and to be moved selectively to a substantially parallel, folded position for storage and transport. For example, interconnecting one end of the frame sections 13 and 15 is a universal joint 24 carried by brackets 25 and 26 that are attached to the frame sections 13 and 15. This universal joint 24 enables the harrow frames 10 and 11 to be expanded or folded.

The other frame sections 12 and 14 are operatively interconnected by a pair of toggle arms 27 and 30. The toggle arm 27 is pivotally mounted by bracket 31 attached to the frame section 12, while the toggle arm 30 is pivotally mounted by bracket 32 attached to the frame section 14. The adjacent ends of the toggle arms 27 and 30 are pivotally interconnected by pivot pin 33. When in the folded position illustrated, the toggle arms 27 and 30 are folded with the pivot pin 33 being disposed toward the opposite harrow end and toward the universal joint 24. Bumpers 34 attached to the toggle arms 27 and 30 abut to determine the collapsed position of the toggle arms 27 and 30, and to hold the harrow frames 10 and 11 in substantially parallel, folded position.

Depending from and carried by each of the frame sections 12 through 15, are a pair of disc gangs generally referred to by 35 and 36. As is usual, the disc gangs 35 and 36 carried by the rear harrow frame 10 are disposed so that the discs face in one direction, while the disc gangs 35 and 36 carried by the front harrow frame 11 are disposed so that the discs face in the opposite direction.

Resilient means is provided between the frame sections 12 and 13 at their hinge connection, and between the frame sections 14 and 15 at their hinge connection in order to provide a controlled flexing action to accommodate differences and changes in ground contour. The resilient means between the frame sections 12 and 13 includes a leaf spring 37 extending between the frame sections 12 and 13 and overlapping the hinge pin 20. The ends of the leaf spring 37 are slidably restrained by U-shaped brackets 40 fixed to the adjacent ends of the frame sections 12 and 13.

The resilient means interconnecting the frame sections 14 and 15 includes a leaf spring 41 extending between the frame sections 14 and 15 and overlapping the hinge pin 23. The ends of the leaf spring 41 are slidably restrained by U-shaped brackets 42 fixed to the adjacent ends of the frame sections 14 and 15.

The harrow 10 is selectively carried and transported by a pair of transport units generally indicated by 43 and 44. The first transport unit 43 includes a pair of laterally spaced arms 45 and 46 slidably received in compatible sockets 47 formed in the ends of the frame sections 13 and 15. The arms 45 and 46 are detachably connected to the frame sections 13 and 15 and retained in the sockets 47 by retaining pins 50.

The first transport unit 43 includes a substantially rectangular frame 51, the side members 52 of which are pivotally connected to the spaced arms 45 and 46 by transversely aligned pivot pins 53 defining a pivot axis.

Mounted to and extending between the top and bottom cross members 54 of the rectangular frame 51 is a support post 55 that extends downwardly below the rectangular frame 51. Mounted on the lower end of post 55 are a pair of ground wheels 56, constituting ground-engaging members, the axle of the wheels 56 constituting a rotative axis.

In the raised position of the harrow 10, as shown in FIGS. 1 through 4, the transport unit frame 51 is fixed in an angular position relative to a vertical transverse plane passed through the pivot axis defined by hinge pins 53, by a pair of retaining pins 57 interconnecting the side frame members 52 and the spaced arms 45 and 46. It will be noted that the wheel 56 is offset outwardly relative to the vertical transverse plane passed through the pivot axis defined by hinge pins 53 so that the weight of the harrow tends to swing the transport unit frame 51 about the pivot axis to lower the harrow.

A pull tongue 60 is fixed to the center post 55. The pull tongue 60 can be selectively attached to a suitable vehicle, such as a tractor, to transport the carrier and harrow.

The second transport unit 44 includes a pair of laterally spaced arms 61 and 62 that are slidably received in compatible sockets 63 formed in the ends of the frame sections 12 and 14. The arms 61 and 62 are detachably connected to the frame sections 12 and 14 by retaining pins 64. The second transport unit includes a substantially H-shaped frame 65 having side members 66 pivotally connected to the arms 61 and 62 by transversely aligned pivot pins 67 defining a pivot axis. Extending between the lower ends of the side members 66 is an axle 70 that carries a pair of ground wheels 71 constituting ground-engaging means. The axle 70 defines a rotative axis.

As is shown in FIGS. 1 through 4, the transport unit frame 65 is angularly inclined relative to a transverse vertical plane passed through the pivot axis defined by the pivot pins 67, and is selectively retained in such position by a pair of retaining pins 72 interconnecting the frame member 66 and the associated arms 61 and 62. It will be noted that the wheels 71 are offset outwardly relative to the vertical plane passed through the pivot axis defined by pivot pins 67 so that the weight of the harrow tends to swing the transport unit frame 65 about the pivot axis to lower the harrow.

It will be understood that the wheels 56 of the first transport unit 43 are offset outwardly relative to the vertical plane passed through the pivot axis defined by pivot pins 53 a greater distance than the wheels 71 of the second transport unit 44 are offset outwardly from the vertical plane passed through the pivot axis defined by pivot pins 67. This difference in offset distance is readily determined by a comparison of the distances indicated by arrows A and B.

This important structural arrangement enables the frame 51 of the first transport unit 43 to swing about its pivot axis defined by pivot pins 53 to lower its harrow end before the frame 65 of the second transport unit 44 swings about its pivot axis defined by pivot pins 67 to lower its harrow end, and enables the frame 51 of the first transport unit 43 to swing about its pivot axis to raise its harrow end after the frame 65 of the second transport unit 44 swings about its pivot axis to raise its harrow end.

An elevating means operatively interconnects both transport units 43 and 44 to lower one end of the harrow through one transport unit and subsequently lower the other end of the harrow through the other transport unit, and to raise the said other end of the harrow through the said other transport unit and subsequently raise the said one end of the harrow through the said one transport unit.

The elevating means includes a pulley 73 detachably connected by a hook 74 to a cross pin carried by a bracket 76 fixed to and depending from the transport unit frame 51. The pulley 73, by its connection to the transport unit frame 51, is located intermediate the first transport unit 43 and is located intermediate the harrow frames 10 and 11.

The elevating means includes a differential winch 77 mounted on the transport unit frame 65 between the side members 66. The winch 77 can be turned by applying a suitable tool such as a crank 80 to the winch shaft 81 or by applying some suitable power means (not shown).

The differential winch 77 and the pulley 73 are operatively interconnected by a cable 82, constituting a tension member, operatively interconnecting the transport units 43 and 44. Upon turning the winch 77 in one direction or the other, the cable will be expanded or contracted so as to lower or raise the transport unit frames 51 and 65, assuming that such transport unit frames 51 and 65 are released by the removal of the retaining pins 57 and 72.

To condition the harrow for lifting and transport, the frame sections 12 and 13 and the frame sections 14 and 15 must be tied rigidly together in order to avoid any relative flexing action. A pair of bridges 83 are utilized. Each bridge 83 includes side plates 84 rigidly connected at the ends by pressure plates 85 and 86 and at the center by a pressure plate 87.

To interconnect the frame sections 12 and 13, a bridge 83 is disposed over the adjacent ends of such frame sections 12 and 13 in overlapping relation to the hinge pin 20 and to the leaf spring 37. Pressure plate 85 engages the frame section 12, while pressure plate 86 engages the frame section 13. A bolt 90, constituting a fastener, is integral with the hinge pin 20 and extends upwardly through the leaf spring 37 and through the center pressure plate 87. A nut 91 applied to the bolt 90 and engaging the top side of the center pressure plate 87 acts through the hinge pin 20 to urge the frame sections 12 and 13 tightly against the pressure plates 85 and 86, thereby fixing the bridge 83 rigidly between the frame sections 12 and 13.

A similar bridge 83 is applied between frame sections 14 and 15. In this instance, a bolt 92, constituting a fastener, is formed integral with the hinge pin 23 and extends upwardly through the leaf spring 41 and through the center pressure plate 87. A nut 93 is applied to the bolt 92 and against the top side of center pressure plate 87. The nut 93 and bolt 92, acting through the hinge pin 23, clamp the pressure plates 85 and 86 tightly against the frame sections 14 and 15. The bridge 83 rigidly interconnects the frame sections 14 and 15 to preclude any relative flexing action at the hinge connection.

As will be later explained, the bridges 83 can be utilized to hold the frame sections 12 and 13 and the frame sections 14 and 15 in an arch when the harrow is lifted and during transport, as is best illustrated in FIGS. 2a and 2b.

It is thought that the functional advantages of the carrier have become fully apparent from the foregoing detailed description of parts, but for completeness of disclosure, the usage of the carrier will be briefly described. It will be assumed that the harrow is in the raised position, that the transport units 43 and 44 are attached, and that the harrow frames 10 and 11 are maintained rigid by bridges 83. It will be further assumed that it is desired to lower the harrow and condition it for usage.

Figure 7:
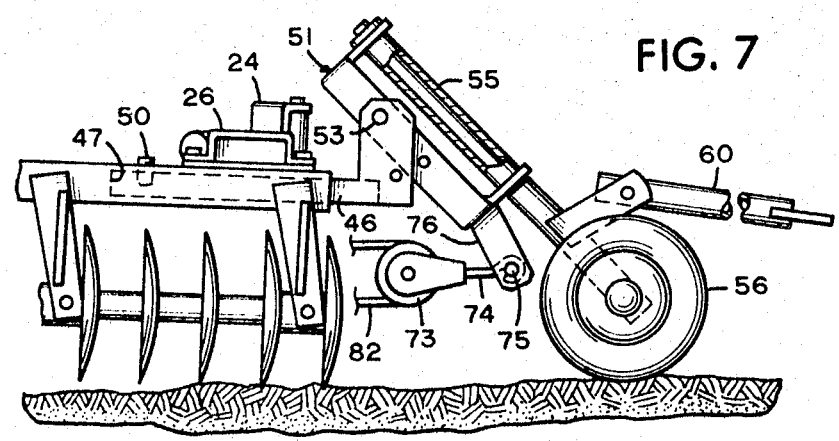
FIG. 7 is a fragmentary front elevational view of the right transport unit conditioned to lower the associated harrow end.
Figure 8:
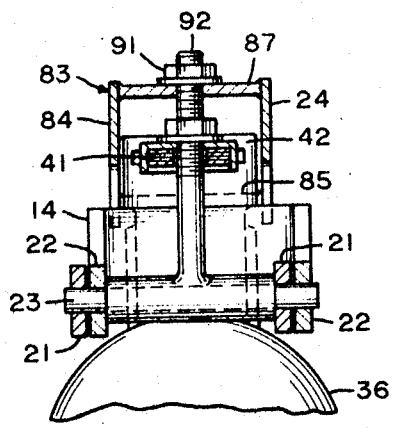
FIG. 8 is an enlarged cross-sectional view of the hinge connection as taken along line 8—8 of FIG. 6.

First, the safety retaining pins 57 and 72 are removed from the respective transport units 43 and 44. The winch 77 is turned by crank 80 in a direction so as to expand the length of the interconnecting cable 82. It will be importantly understood that the weight of the harrow tends to pivot the transport unit frame 51 first about the pivot axis defined by pivot pins 53 until that harrow end is completely lowered to the position illustrated in FIG. 7. Only after the first transport unit 43 is completely lowered, will the weight of the harrow tend to pivot the transport unit frame 65 about its pivot axis defined by pivot pins 67 to lower that associated harrow end to the position illustrated in FIG. 5. This predetermined and advantageous sequence in the pivotal action of the transport units 43 and 44 during lowering operation is achieved because the wheels 56 of the transport unit 43 are offset a greater distance than the wheels 71 of the transport unit 44 relative to vertical planes passed through the respective pivot axes defined by pivot pins 53 and 67.

When the harrow has been lowered, the winch 77 is turned further to provide sufficient slack in cable 82 in order to disconnect the pulley hook 74 from the cross pin 75, thereby releasing the pulley 73 and operatively disconnecting the elevating means from the transport units 43 and 44. Then, the retaining pins 50 are loosened to release the arms 45 and 46 from the frame sections 13 and 15. The arms 45 and 46 are then slidably removed from the compatible frame sockets 47 to disconnect the first transport unit 43 operatively from the harrow. Similarly, the retaining pins 64 are loosened to disconnect the arms 61 and 62 from the frame sections 12 and 14. The arms 61 and 62 are then slidably removed from the compatible frame sockets 63 in order to disconnect the second transport unit 44 operatively from the harrow.

To complete the take-down operation, the bridges 83 are removed by loosening of the nuts 91 and 93 from their respective bolts 90 and 92. It will be understood that initial loosening of nuts 91 and 93 will tend to remove any arching between frame sections 12 and 13 and frame sections 14 and 15 and that complete loosening of the nuts 91 and 93 permits removal of the bridges 83. The harrow can then be expanded to its operative position and utilized in the conventional manner.

It will now be assumed that it is desired to condition the harrow for transport. The above-described sequence of steps is substantially reversed. The frames 10 and 11 of the harrow are moved to the folded position illustrated in FIGS. 1a and 1b in which such frames 10 and 11 are substantially parallel.

First, the bridges 83 are connected to and between the frame sections 12 and 13 and the frame sections 14 and 15 by the application of nuts 91 and 93 to the respective bolts 90 and 92 of the hinge connections. When the bridges 83 are pulled up tight, the frame sections comprising the harrow frames 10 and 11 will be rigid to preclude any resilient flexing action.

Figure 5:
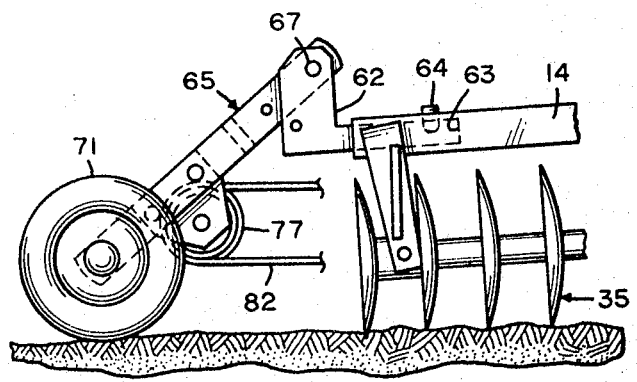
FIG. 5 is a fragmentary front elevational view of the left transport unit conditioned to lower the associated harrow end.
Figure 6:
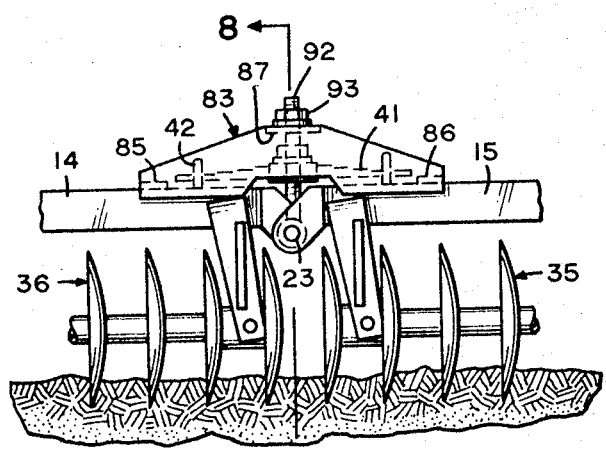
FIG. 6 is a fragmentary front elevational view of the frame sections comprising the harrow at their hinge connection, the harrow being shown in its lowered position.

The second transport unit 44 is attached to the harrow by inserting the arms 61 and 62 into the frame sockets 63 as indicated in FIG. 5. The arms 61 and 62 are fixed to the frame sections 12 and 14 by tightening the retaining pins 64.

Then, the first transport unit 43 is operatively connected to the harrow by the insertion of arms 45 and 46 into the compatible frame sockets 47. The arms 45 and 46 are secured to the frame sections 13 and 15 by tightening the retaining pins 50.

The elevating means is then operatively interconnected between the transport units 43 and 44 by attaching the pulley hook 74 to the cross pin 75. Upon turning the winch 77 in the appropriate direction by crank 80, the cable 82 will be contracted in length so as to exert an inward pull on each of the transport units 43 and 44. As will be understood, the transport unit frame 65 will pivot first about its pivot axis defined by pivot pins 67 to raise the associated harrow end. When this harrow end is completely lifted, the tensional force exerted by cable 82 will then act to pivot the transport unit frame 51 about its pivot axis defined by pivot pins 53, whereby to raise its associated harrow end. It will be understood that the ends of the harrow are lifted or lowered in sequence and not simultaneously.

After the harrow is completely raised by the transport units 43 and 44, the safety retaining pins 57 and 72 are inserted to interlock the transport unit frames with their associated lateral arms in order to preclude any pivotal movement about their pivot connection. After the safety retaining pins 57 and 72 are placed, the cable 82 may be slacked off to remove the tension in the cable 82. These safety retaining pins 57 and 72 prevent the harrow from falling if the cable 82 snaps.

The transport units 43 and 44 now support the harrow in a raised position and hold the harrow frames 10 and 11 in the folded position, ready to transport.

It is desirable to arch the harrow frames, as is best illustrated in FIGS. 2a and 2b, when the harrow is being transported. This arch is provided by tightening the nuts 91 and 93 on their respective bolts 90 and 92 to such an extent that the interconnected frame sections 12 and 13 and frame sections 14 and 15 are angularly related under the resilient loading of the leaf springs 37 and 41. The bridges 83 hold the interconnected frame sections 12 and 13 and frame sections 14 and 15 rigidly in the predetermined angular relation. This arch configuration of the harrow is extremely important when the harrow must be passed over a crown in the road or highway such as that presented by a railway crossing. In order to clear such a railway crossing, the harrow must be arched in the manner described.

I claim as my invention:

1. A carrier for a harrow, comprising:
   (a) a harrow having interconnected frames movable to a substantially parallel folded inoperative position for transportation,
   (b) a first transport unit detachably connected to one end of the folded harrow,
   (c) a second transport unit detachably connected to the opposite end of the folded harrow in spaced longitudinal relation to the first transport unit, and
   (d) elevating means carried by the transport units for selectively raising the opposed ends of the folded harrow for transportation.

2. A carrier for a harrow as defined in claim 1, in which:
   (e) the elevating means operatively interconnects both transport units to lower one end of the folded harrow through one transport unit and subsequently lower the other end of the folded harrow through the other transport unit to condition the harrow for usage.

3. A carrier for a harrow as defined in claim 2, in which:
   (f) each transport unit includes a pivotally mounted frame, and a ground-engaging member carried by the pivotally mounted frame,
   (g) the ground-engaging member is positioned relative to a vertical transverse plane passed through the pivot axis of the associated transport unit frame so that the weight of the harrow tends to swing the transport unit frame about the pivot axis to lower the harrow, and
   (h) the ground-engaging member of one transport unit is offset relative to the vertical plane a greater distance than the ground-engaging member of the other transport unit so that the frame of the said one transport unit swings about its pivot axis to lower its harrow end before the frame of the said other transport unit swings about its pivot axis to lower its harrow end, and so that the frame of the said one transport unit swings about its pivot axis to raise its harrow end after the frame of the said other transport unit swings about its pivot axis to raise its harrow end.

4. A carrier for a harrow as defined in claim 3, in which:
   (i) pin-retaining means disposed in spaced relation from the pivot axis operatively fixes the pivotally mounted frame of each transport unit selectively to lock the harrow in the raised position.

5. A carrier for a harrow, comprising:
   (a) a harrow having interconnected frames movable to a folded position,
   (b) a first transport unit detachably connected to one end of the harrow,
   (c) a second transport unit detachably connected to the opposite end of the harrow,
   (d) elevating means carried by the transport units for selectively raising the harrow for transportation,
   (e) each transport unit includes a pivotally mounted frame, and a ground-engaging member carried by the pivotally mounted frame,
   (f) the ground-engaging member is positioned relative to a vertical transverse plane passed through the pivot axis of the associated transport unit frame so that the weight of the harrow tends to swing the transport unit frame about the pivot axis to lower the harrow, and
   (g) the elevating means includes a tension member extending between and interconnecting the pivoted frame of the transport units, the tension member being expanded or contracted to lower or raise the frames of the transport units and thereby lower or raise the harrow.

6. A carrier for a harrow, comprising:
   (a) a harrow having interconnected frames movable to a folded position,
   (b) a first transport unit detachably connected to one end of the harrow,
   (c) a second transport unit detachably connected to the opposite end of the harrow,
   (d) elevating means carried by the transport units for selectively raising the harrow for transportation,
   (e) each transport unit includes a pivotally mounted frame, and a ground-engaging member carried by the pivotally mounted frame,
   (f) the ground-engaging member is positioned relative to a vertical transverse plane passed through the pivot axis of the associated transport unit frame so that the weight of the harrow tends to swing the transport unit frame about the pivot axis to lower the harrow, and
   (g) the elevating means includes a pulley carried by the frame of one transport unit,
   (h) a winch is carried by the frame of the other transport unit, and
   (i) a cable operatively interconnects the winch and pulley, whereby selective turning of the winch will pivot the frames of the transport units and hence raise or lower the harrow.

7. A carrier for a harrow, comprising:
   (a) a harrow having interconnected frames movable to a folded position,
   (b) a first transport unit detachably connected to one end of the harrow,
   (c) a second transport unit detachably connected to the opposite end of the harrow,
   (d) elevating means carried by the transport units for selectively raising the harrow for transportation,
   (e) each transport unit includes a pivotally mounted frame, and a ground-engaging member carried by the pivotally mounted frame,
   (f) the ground-engaging member is positioned relative to a vertical transverse plane passed through the pivot axis of the associated transport unit frame so that the weight of the harrow tends to swing the transport unit frame about the pivot axis to lower the harrow, and
   (g) the elevating means includes a pulley carried by the frame of one transport unit,
   (h) a winch is carried by the frame of the other transport unit, and
   (i) a cable operatively interconnects the winch and pulley, whereby selective turning of the winch will pivot the frames of the transport units and hence raise or lower the harrow, and
   (j) the ground-engaging member of one transport unit is offset relative to the vertical plane a greater distance than the ground-engaging member of the other transport unit so that the frame of the said one transport unit swings about its pivot axis to lower its harrow end before the frame of the said other transport unit swings about its pivot axis to lower its harrow end, and so that the frame of the said one transport unit swings about its pivot axis to raise its harrow end after the frame of the said other transport unit swings about its pivot axis to raise its harrow end.

8. A carrier for a harrow as defined in claim 1, in which:
(e) the elevating means extends between and operatively inter-connects the transport units, the elevating means including means detachable from a transport unit thereby disconnecting the transport units from the elevating means and from each other to enable detachment of the transport units from the harrow frames.

9. A carrier for a harrow as defined in claim 1, in which:
(e) each transport unit includes a pair of arms and a frame pivotally mounted to the arms,
(f) means detachably mounts the arms in fixed relation to the harrow end, and
(g) a ground wheel is carried by the pivotally mounted transport unit frame, the wheel being offset relative to a vertical transverse plane passed through the pivot axis of the associated transport unit frame.

10. A carrier for a harrow as defined in claim 9, in which:
(h) the pair of each transport unit are detachably mounted in substantially parallel relation to the harrow frames, associated arms of a pair being disposed in fixed spaced relation to each other, whereby to hold the harrow frames in folded position for transportation.

11. A carrier for a harrow, comprising:
(a) a harrow having interconnected frames movable to a folded position,
(b) a first transport unit detachably connected to one end of the harrow,
(c) a second transport unit detachably connected to the opposite end of the harrow,
(d) elevating means carried by the transport units for selectively raising the harrow for transportation,
(e) each transport unit includes a pair of arms and a frame pivotally mounted to the arms,
(f) means detachably mounts the arms to the harrow end, and
(g) a ground wheel is carried by the pivotally mounted transport unit frame, the wheel being offset relative to a vertical transverse plane passed through the pivot axis of the associated transport unit frame,
(h) each of the harrow frames at each harrow end is provided with a socket,
(i) the pair of arms of each transport unit interfit the frame sockets at the associated harrow end, and
(j) the said detachable means fastens the pair of arms in the associated sockets and to the associated harrow frames, whereby to secure the transport units to the harrow and to hold the harrow frames in folded position.

12. A carrier for a harrow, comprising:
(a) a harrow having interconnected frames movable to a folded position,
(b) a first transport unit detachably connected to one end of the harrow,
(c) a second transport unit detachably connected to the opposite end of the harrow,
(d) elevating means carried by the transport units for selectively raising the harrow for transportation,
(e) each of the pivotally connected harrow frames includes a pair of frame sections,
(f) a hinge connection is provided between each associated pair of frame sections,
(g) resilient means interconnects each associated pair of frame sections at the hinge connection for a controlled flexing action, and
(h) a bridge selectively interconnects each pair of associated frame sections at the hinge connection to hold the frame sections rigid for elevation and transport of the harrow.

13. A carrier for a harrow as defined in claim 12, in which:
(i) the bridges hold the associated frame sections in an arch between the harrow ends when the harrow is raised for transport.

14. A carrier for a harrow as defined in claim 12, in which:
(i) the hinge connection includes a hinge pin interconnecting the associated frame sections, and a fastener attached to the hinge pin, and
(j) an adjustable connection is provided between the fastener and the bridge at the hinge connection, the adjustable connection fixing the associated frame sections in a predetermined angular relation after the harrow is raised.

15. A carrier for a harrow as defined in claim 14, in which:
(k) the resilient means includes a leaf spring extending between and interconnecting associated frame sections, the leaf spring lapping the hinge pin,
(l) the fastener extends through the leaf spring,
(m) the bridge laps the hinge pin and receives the fastener, and
(n) the adjustable connection pulls on the hinge pin through the fastener to arch the frame sections.

References Cited

UNITED STATES PATENTS

| 2,022,575 | 12/1935 | Buffington | 172—421 |
| 2,226,586 | 12/1940 | Seaholm | 172—240 |
| 2,469,622 | 5/1949 | Acton | 172—572 XR |

ANTONIO F. GUIDA, Primary Examiner

JAMES W. PETERSON, Assistant Examiner

U.S. Cl. X.R.

172—568